(12) United States Patent
Hosono et al.

(10) Patent No.: US 10,396,350 B2
(45) Date of Patent: Aug. 27, 2019

(54) METHOD FOR MANUFACTURING ELECTRODE FOR LITHIUM ION BATTERY

(71) Applicants: ZEON CORPORATION, Chiyoda-ku, Tokyo (JP); TOYOTA JIDOSHA KABUSHIKI KAISHA, Toyota-shi, Aichi-ken (JP)

(72) Inventors: Yuto Hosono, Tokyo (JP); Junya Mori, Okazaki (JP)

(73) Assignees: ZEON CORPORATION, Chiyoda-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/539,778

(22) PCT Filed: Dec. 18, 2015

(86) PCT No.: PCT/JP2015/085446
§ 371 (c)(1),
(2) Date: Jun. 26, 2017

(87) PCT Pub. No.: WO2016/111137
PCT Pub. Date: Jul. 14, 2016

(65) Prior Publication Data
US 2017/0352874 A1    Dec. 7, 2017

(30) Foreign Application Priority Data
Jan. 5, 2015    (JP) .................................. 2015-000293

(51) Int. Cl.
*H01M 4/139* (2010.01)
*H01M 4/04* (2006.01)
*H01M 10/0525* (2010.01)

(52) U.S. Cl.
CPC ......... *H01M 4/139* (2013.01); *H01M 4/0409* (2013.01); *H01M 4/0435* (2013.01); *H01M 4/0469* (2013.01); *H01M 10/0525* (2013.01)

(58) Field of Classification Search
CPC ............. H01M 4/0435; H01M 4/0409; H01M 4/0469; H01M 4/139; H01M 10/0525
See application file for complete search history.

(56) References Cited

U.S. PATENT DOCUMENTS

2016/0043382 A1* 2/2016 Tanihara ............... H01M 4/139
427/194

FOREIGN PATENT DOCUMENTS

JP    2002212608 A  *  7/2002
JP    2002212608 A     7/2002
(Continued)

OTHER PUBLICATIONS

Machine translation for JP 2002-212608 A. (Year: 2018).*
(Continued)

*Primary Examiner* — Edu E. Enin-Okut
(74) *Attorney, Agent, or Firm* — Kenja IP Law PC

(57) ABSTRACT

A method for manufacturing an electrode for a lithium ion battery is provided. A powder layer is formed by using a squeegee roll to squeegee powder including an electrode active material and supplied onto a substrate, and then compacted on the substrate by means of a pair of press rolls while conveying the substrate vertically downward to form an electrode sheet. The method includes: supplying the powder onto the substrate; leveling the powder supplied onto the substrate to form the powder layer using the squeegee roll which is disposed in a position so that a squeegee angle formed by a vertical line passing through the rotating axis of one of the press rolls and a line passing through said rotating axis and the rotating axis of the
(Continued)

squeegee roll is 0° to 60°; and compacting the powder layer on the substrate using the pair of press rolls.

2 Claims, 1 Drawing Sheet

(56) References Cited

FOREIGN PATENT DOCUMENTS

| | | | |
|---|---|---|---|
| JP | 2009224623 A | 10/2009 | |
| JP | 2009287068 A | 12/2009 | |
| WO | 2014156357 A1 | 10/2014 | |
| WO | WO-2014156357 A1 * | 10/2014 | ............ H01M 4/139 |

OTHER PUBLICATIONS

Mar. 22, 2016, International Search Report issued in the International Patent Application No. PCT/JP2015/085446.

Jul. 11, 2017, International Preliminary Report on Patentability issued in the International Patent Application No. PCT/JP2015/085446.

Jun. 8, 2018, Extended European Search Report issued by the European Patent Office in the corresponding European Patent Application No. 15877010.7.

* cited by examiner

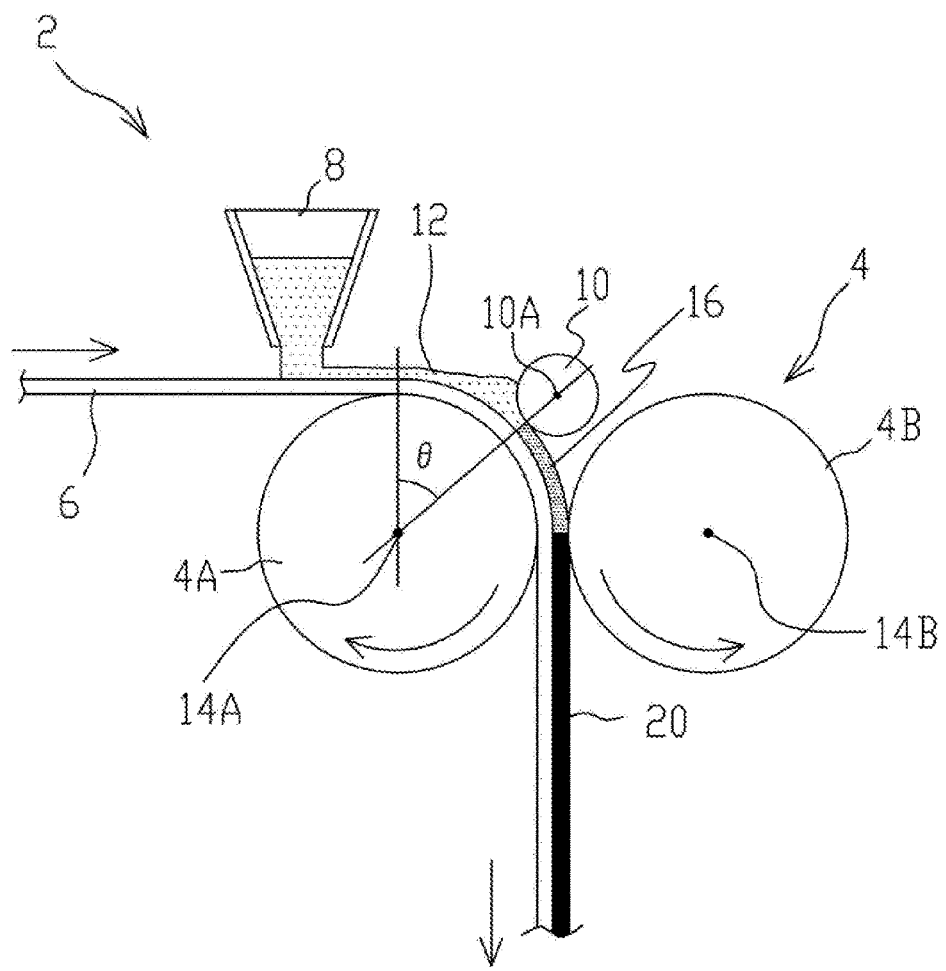

METHOD FOR MANUFACTURING ELECTRODE FOR LITHIUM ION BATTERY

TECHNICAL FIELD

The present invention relates to a method for manufacturing an electrode for a lithium ion battery, which includes molding powder that contains an electrode active material and the like by compression.

BACKGROUND ART

Increase in demand of lithium ion batteries, which have small sizes, light weight, high energy density and repeated chargeability/dischargeability, is expected to be continued for environmental response. Since lithium ion batteries have been utilized in the field of mobile phones, notebook computers and the like in virtue of their high energy density, further improvement of their functions including resistance reduction and capacity enlargement has been required due to their increasing and expanding use.

An electrode for a lithium ion battery can be obtained as an electrode sheet. For example, Patent Literature 1 discloses a method for manufacturing an electrode sheet, which includes: supplying powder onto a substrate so as to form a powder layer on a surface of the substrate; and allowing the substrate to pass through between a pair of press rolls so as to mold the powder layer by compression continuously onto the surface of the substrate.

CITATION LIST

Patent Literature

Patent Literature 1: JP 2009-224623 A

SUMMARY OF INVENTION

Technical Problem

By the way, in the case of manufacturing an electrode sheet by the above-described method for manufacturing the electrode sheet, since a substrate is conveyed downwardly from an upper place while the substrate passes through between the pair of the press rolls, the powder supplied on the substrate may slip down from above the substrate until it is conveyed to the pair of the press rolls, thereby causing nonuniformity in thickness and density of the electrode sheet.

The present invention aims to provide a method for manufacturing an electrode for a lithium ion battery, by which powder squeegeed on a substrate does not slip down from above the substrate until it is conveyed to a pair of press rolls.

Solution to Problem

As a result of the intensive study, the inventors of the present invention have found to active the above-described object by changing a squeegee angle at which a squeegee roll is installed, thereby completing the present invention.

That is, according to the present invention, there are provided:

(1) a method for manufacturing an electrode for a lithium ion battery, in which a squeegee roll squeegees powder containing an electrode active material, which is supplied on a substrate, to form a powder layer, and a pair of press rolls compacts the powder layer onto the substrate while conveying the substrate downwardly in a vertical direction to manufacture an electrode sheet, the method including: a supplying step for supplying the powder onto the substrate; a powder layer forming step for forming the powder layer by leveling the powder supplied on the substrate using the squeegee roll that is arranged at a position with a squeegee angle θ ranging from 0° to 60°, which is an angle between a vertical line that intersects a rotating axis of one of the press rolls and a line that connects the rotating axis with a rotating axis of the squeegee roll; and a compacting step for compacting the powder layer onto the substrate by the pair of the press rolls;

(2) the method for manufacturing an electrode for a lithium ion battery according to (1), in which the powder layer formed by the powder layer forming step has density that ranges from 105% to 150% of bulk density of the powder; and (3) the method for manufacturing a lithium ion battery according to (1) or (2), in which the squeegee roll is rotated in a same direction as the press roll that faces the squeegee roll.

Advantageous Effects of Invention

According to the present invention, a method for manufacturing an electrode for a lithium ion battery, by which the powder squeegeed on the substrate does not slip down from above the substrate until it is conveyed to the pair of the press rolls, can be provided.

BRIEF DESCRIPTION OF DRAWINGS

FIG. 1 illustrates a schematic drawing of a powder molding apparatus according to an embodiment of the present invention.

DESCRIPTION OF EMBODIMENTS

Hereinafter, a method for manufacturing an electrode for a lithium ion battery according to an embodiment of the present invention will be described with reference to a drawing. FIG. 1 illustrates a schematic drawing of a powder molding apparatus 2 which is used in the method for manufacturing an electrode for a lithium ion battery according to the embodiment of the present invention. As shown in FIG. 1, the powder molding apparatus 2 includes press rolls 4 composed of a pair of rolls 4A and 4B which respectively have rotating axes 14A and 14B at the same heights, and are arranged horizontally in parallel with each other. Further, the powder molding apparatus 2 includes: a hopper 8 which stores powder 12 supplied onto a substrate 6 that is conveyed in a horizontal direction; and a cylindrical squeegee roll 10 which squeegees the powder 12 on the substrate 6 in a way that the substrate 6 with the powder 12 supplied thereon is conveyed horizontally and then downwardly in a vertical direction along an outer periphery of the roll 4A so as to form a powder layer 16 with uniform thickness.

The squeegee roll 10 is disposed at a position with a squeegee angle θ ranging from 0° to 60° and preferably ranging from 5° to 40°, which provides an interval between a peripheral surface of the roll 4A and a peripheral surface of the squeegee roll 10 to be a predetermined value. Herein, the squeegee angle θ is an angle between a vertical line that intersects the rotating axis 14A of the roll 4A and a line that connects the rotating axis 14A with a rotating axis 10A of the squeegee roll 10. Further, the squeegee roll 10 is rotated in a direction same as that of the roll 4A facing the squeegee roll 10. That is, the squeegee roll 10 squeegees the powder on the substrate 6, while being rotated in a direction reverse to the conveying direction of the substrate 6 with the powder 12 supplied thereon.

In the case of manufacturing an electrode sheet 20 as an electrode for a lithium ion battery using this powder molding apparatus 2, the powder 12 is firstly supplied from the hopper 8 onto the substrate 6, which is conveyed in the horizontal direction and is coated with a binder (Supplying Step).

Next, the direction to convey the substrate 6 with the powder 12 supplied thereon is changed to the downward vertical direction along the outer periphery of the roll 4A, and the powder 12 supplied onto the surface of the substrate 6 is squeegeed by the squeegee roll 10, thereby forming the powder layer 16 on the surface of the substrate 6 (Powder Layer Forming Step). Here, the powder layer 16 squeegeed has density that is 105% to 150% of bulk density of the powder 12.

The substrate 6 with the powder layer 16 formed thereon is conveyed to a press point of the press rolls 4, and passes through between the pair of the rolls 4A and 4B (Compacting Step). Thereby, the powder layer 16 is compacted onto the surface of the substrate 6, thereby manufacturing the electrode sheet 20.

In the method for manufacturing an electrode for a lithium ion battery according to the present embodiment, the powder 12 is deposited between the roll 4A and the squeegee roll 10 on an upstream side of the squeegee roll 10, as shown in FIG. 1. Thus, self-weight is applied to the powder 12 before the squeegee roll 10 squeegees the powder 12, whereby the density of the powder layer 16 is increased just after the squeegeeing. Thereby, grip force of the powder layer 16 is increased, and thus, the powder 12 does not fall from the powder layer 16 before it is pressed by the pair of the rolls 4A and 4B, so that the electrode sheet 20 which has uniform thickness and density can be manufactured.

Incidentally, in this embodiment, the substrate 6 may be a thin film substrate, and its thickness generally ranges from 1 µm to 1000 µm and preferably ranges from 5 µm to 800 µm. Examples of the substrate 6 include metal foils of aluminum, platinum, nickel, tantalum, titanium, stainless steel, copper and other alloys; carbon; conductive polymer; paper; natural fiber; polymer fiber; cloth; and a polymer resin film, which can be selected appropriately according to the purpose. Examples of the polymer resin film include polyester resin films such as polyethylene terephthalate and polyethylene naphthalate; and plastic films and sheets containing polyimide, polypropylene, polyphenylene sulfide, polyvinyl chloride, aramid film, PEN, PEEK or the like.

Among them, in the case of manufacturing the electrode sheet 20 as the electrode for a lithium ion battery, metal foil, a carbon film and a conductive polymer film can be used as the substrate 6, and metal is preferably used. Among them, copper, aluminum and aluminum alloy are preferably used in view of the conductivity and the voltage resistance. Further, the surface of the substrate 6 may be processed by coating, drilling, buffing, sand blasting, etching and/or the like.

Coating liquid for the binder is SBR aqueous dispersion, and a concentration of SBR ranges from 10 wt % to 40 wt %. A glass transition temperature of SBR is within a range of −50° C. to 30° C. The coating liquid for the binder may contain a thickening agent or a surfactant to adjust viscosity or wettability of the coating liquid. As the thickening agent and the surfactant, known thickening agents and surfactants can be used. Further, as the binder, aqueous polyacrylic acid (PAA), organic solvent-based polyvinylidene fluoride (PVDF) or the like may be used other than SBR.

As the powder 12 to be stored in the hopper 8, composite particles containing an electrode active material can be exemplified. The composite particles contain the electrode active material and a binder, and may further contain other dispersing agent, conductive material or additive as necessary.

In the case of using the composite particles as an electrode material of a lithium ion battery, a positive electrode active material may be metal oxide to which a lithium ion can be doped or from which a lithium ion can be dedoped reversibly. Examples of the metal oxide include lithium cobalt oxide, lithium nickel oxide, lithium manganese oxide, lithium iron phosphate and the like. Note that, the positive electrode active material exemplified above can be used alone or as a mixture of plural kinds appropriately according to intended use.

Further, as an active material for a negative electrode, which is a counter electrode of the positive electrode for a lithium ion battery, low crystalline carbon (amorphous carbon) such as graphitizable carbon, non-graphitizable carbon and pyrolytic carbon, graphite (natural graphite and artificial graphite), alloy materials such as tin and silicon, and oxide such as silicon oxide, tin oxide and lithium titanate can be exemplified. Note that, the electrode active materials exemplified above can be used alone or as a mixture of plural kinds appropriately according to intended use.

The electrode active material for the electrode for a lithium ion battery is preferably shaped into a granular shape. If the shape of the particles is spherical, the electrode with higher density can be obtained when the electrode is molded.

Volume average particle diameters of the electrode active materials for both of the positive electrode and the negative electrode as the electrodes for a lithium ion battery generally range from 0.1 µm to 100 µm, preferably ranges from 0.5 µm to 50 µm, and more preferably ranges from 0.8 µm to 30 µm.

The binder to be used in the composite particles is not limited as long as it can bind the electrode active material to each other. A preferable binder is a dispersion-type binder that has a property of being dispersed in a solvent. Examples of the dispersion-type binder include polymer compounds such as silicon-based polymer, fluorine-containing polymer, conjugated diene polymer, acrylate polymer, polyimide, polyamide and polyurethane. Among them, fluorine-containing polymer, conjugated diene polymer and acrylate polymer are preferable, and conjugated diene polymer and acrylate polymer are more preferable.

A shape of the dispersion-type binder is not limited particularly, but is preferably a particle shape. Due to the particle shape, an excellent binding property is obtained and lowering in a capacity and deterioration which is caused by repetition of charging and discharging in a manufactured electrode can be supressed. Examples of the particle binder include a binder in which binder particles are dispersed in water, such as latex, and particles obtained by drying such dispersion liquid.

An amount of the binder generally ranges from 0.1 parts by weight to 50 parts by weight, preferably ranges from 0.5 parts by weight to 20 parts by weight, and more preferably ranges from 1 part by weight to 15 parts by weight on a dry weight basis with respect to 100 parts by weight of the electrode active material, in order to sufficiently secure adhesion between an electrode active material layer to be obtained and the substrate and also to reduce internal resistance.

As described above, the dispersing agent may be used in the composite particles as necessary. Specific examples of the dispersing agent include cellulose polymer such as carboxymethyl cellulose and methyl cellulose; and ammonium salts and alkali metal salts thereof. These dispersing agents can be used alone or in combination of two or more kinds thereof.

As described above, the conductive material may be used in the composite particles as necessary. Specific examples of the conductive material include conductive carbon black such as furnace black, acetylene black and Ketjen black (registered trademark of Akzo Nobel Chemicals B.V.). Among them, acetylene black and Ketjen black are preferable. These conductive materials can be used alone or in combination of two or more kinds thereof.

The composite particles can be obtained by the granulation using the electrode active material, the binder and other component such as the conductive material, which is added as necessary, and contain at least the electrode active material and the binder. Each of the above-described materials is not present as an individual and independent particle, but two or more components as constituent components containing the electrode active material and the binder form one particle. More specifically, a plurality of (preferably several to several tens of) particles of the electrode active material preferably bonded to one another with the binder to form a particle, while a plurality of individual particles of two or more components described above bind so as to form a secondary particle.

A method for producing the composite particles is not particularly limited, but may be known granulation methods such as fluidized bed granulation, spray drying granulation and rolling bed granulation.

A volume average particle diameter of the composite particles generally ranges from 0.1 μm to 1000 μm, preferably ranges from 1 μm to 500 μm, and more preferably ranges from 30 μm to 250 μm, in order to easily obtain the electrode active material layer with a desired thickness.

Note that, the average particle diameter of the composite particles is a volume average particle diameter calculated from particle diameters which are measured by a laser diffraction particle size distribution analyzer (for example, SALD-3100 produced by Shimadzu Corporation).

The invention claimed is:

1. A method for manufacturing an electrode for a lithium ion battery, in which a squeegee roll squeegees powder containing an electrode active material, which is supplied on a substrate, to form a powder layer, and a pair of press rolls compacts the powder layer onto the substrate while conveying the substrate downwardly in a vertical direction to manufacture an electrode sheet, the method comprising:

a supplying step for supplying the powder stored in a hopper directly onto the substrate from the hopper;

a powder layer forming step for forming the powder layer onto the substrate by squeegeeing and leveling the powder supplied on the substrate using the squeegee roll that is arranged at a position with a squeegee angle θ ranging from 0° to 60°, which is an angle between a vertical line that intersects a rotating axis of one of the press rolls and a line that connects the rotating axis with a rotating axis of the squeegee roll, the squeegeeing and leveling the powder being performed on the substrate; and a compacting step for compacting the powder layer onto the substrate by the pair of the press rolls, wherein the powder layer formed by the powder layer forming step has density that ranges from 105% to 150% of bulk density of the powder.

2. The method for manufacturing an electrode for a lithium ion battery according to claim 1, wherein the squeegee roll is rotated in a same direction as the press roll that faces the squeegee roll.

\* \* \* \* \*